(12) United States Patent
Balikas et al.

(10) Patent No.: US 11,755,596 B2
(45) Date of Patent: Sep. 12, 2023

(54) PERSONALIZED NLS QUERY SUGGESTIONS USING LANGUAGE MODELS

(71) Applicant: Salesforce, Inc., San Francisco, CA (US)

(72) Inventors: Georgios Balikas, Grenoble (FR); Matthieu Michel Robin Landos, Grenoble (FR); Marc Brette, Montbonnot-Saint-Martin (FR); Arieta Shabani, Paris (FR)

(73) Assignee: Salesforce, Inc., San Francisco, CA (US)

( * ) Notice: Subject to any disclaimer, the term of this patent is extended or adjusted under 35 U.S.C. 154(b) by 51 days.

(21) Appl. No.: 17/142,162

(22) Filed: Jan. 5, 2021

(65) Prior Publication Data
US 2022/0215029 A1    Jul. 7, 2022

(51) Int. Cl.
| | | |
|---|---|---|
| *G06F 17/00* | (2019.01) | |
| *G06F 7/00* | (2006.01) | |
| *G06F 16/2457* | (2019.01) | |
| *G06N 5/04* | (2023.01) | |
| *G06N 20/00* | (2019.01) | |
| *G06F 16/242* | (2019.01) | |

(52) U.S. Cl.
CPC ...... *G06F 16/24578* (2019.01); *G06F 16/243* (2019.01); *G06N 5/04* (2013.01); *G06N 20/00* (2019.01)

(58) Field of Classification Search
CPC . G06F 16/24578; G06F 16/243; G06N 20/00; G06N 5/04

USPC ........................................................ 707/748
See application file for complete search history.

(56) References Cited

U.S. PATENT DOCUMENTS

| | | | |
|---|---|---|---|
| 7,730,478 B2 | 6/2010 | Weissman | |
| 10,552,464 B2 | 2/2020 | Roustant et al. | |
| 10,614,061 B2 | 4/2020 | Kempf et al. | |
| 10,628,431 B2 | 4/2020 | Chittar et al. | |
| 10,802,670 B2 | 10/2020 | Brette et al. | |
| 11,210,304 B2 | 12/2021 | Chittar et al. | |
| 2002/0107853 A1* | 8/2002 | Hofmann | G06F 16/335 707/999.007 |
| 2004/0083232 A1* | 4/2004 | Ronnewinkel | G06F 16/332 707/E17.062 |

(Continued)

OTHER PUBLICATIONS

Arkoudas, et al., "Semantically Driven Auto-completion," Bloomberg L.P., Jun. 22, 2019, pp. 1-12.

(Continued)

*Primary Examiner* — Pavan Mamillapalli
(74) *Attorney, Agent, or Firm* — Nicholson, De Vos, Webster & Elliott, LLP

(57) ABSTRACT

A method and apparatus for generating personalized suggestions for natural language search queries, where the method includes receiving a natural language query input from a user, obtaining set of suggestions for the natural language query, identifying a set of concepts in the set of suggestions, applying co-occurrence model to the set of concepts to obtain user specific concept probabilities and vocabulary probabilities, computing suggestion scores for at least one suggestion in the set of suggestions based on the user specific concept probabilities and vocabulary probabilities, and ranking the set of suggestions based on suggestion scores.

21 Claims, 5 Drawing Sheets

(56) References Cited

U.S. PATENT DOCUMENTS

| | | | | |
|---|---|---|---|---|
| 2006/0206445 | A1* | 9/2006 | Andreoli | G06F 3/1204 |
| | | | | 706/52 |
| 2012/0131031 | A1* | 5/2012 | Xie | G06F 16/3338 |
| | | | | 707/765 |
| 2013/0332450 | A1* | 12/2013 | Castelli | G06F 16/3344 |
| | | | | 707/E17.046 |
| 2014/0172652 | A1* | 6/2014 | Pobbathi | G06Q 10/087 |
| | | | | 705/28 |
| 2015/0052098 | A1* | 2/2015 | Kveton | G06Q 50/01 |
| | | | | 706/52 |
| 2020/0034493 | A1 | 1/2020 | Kempf et al. | |
| 2020/0039180 | A1 | 2/2020 | Davis et al. | |
| 2020/0349180 | A1 | 11/2020 | Kempf et al. | |
| 2022/0147435 | A1 | 5/2022 | Borges et al. | |
| 2022/0156251 | A1 | 5/2022 | Kempf et al. | |

OTHER PUBLICATIONS

Breetz, Will, "Meet Einstein Search—Bringing Powerful Enterprise Search to CRM", the 360 blog, Available Online at <https://www.salesforce.com/blog/introducing-einstein-search/?_gl=1*1tz9bey*_ga*Mjc4MjlwNTluMTY1OTI3Mjl1Ng..*_ga_HPRCE01J19*MTY2NjM2%E2%80%A6>, Sep. 18, 2019, pp. 1-10.

Posse, Christian, "How We Built Personalization and Natural Language into CRM Search", Salesforce Engineering Blog, Available Online at <https://engineering.salesforce.com/how-we-built-personalization-and-natural-language-into-crm-search-9f4204395bc1/>, Retrieved on Nov. 2, 2022, pp. 1-6.

Salesforce, "Einstein Search Recommendations—External FAQ", Salesforce B2C Commerce, Version 1.5, Updated on Jun. 26, 2020, pp. 1-20.

* cited by examiner

PERSONALIZED NLS QUERY SUGGESTIONS USING LANGUAGE MODELS

TECHNICAL FIELD

One or more implementations relate to the field of natural language searching; and more specifically, to the generation of query suggestions that are personalized for a user.

BACKGROUND ART

Online systems can store large and varied amounts of data for enterprises. An online system can store data for a single enterprise or for multiple enterprises. For example, a multi-tenant system stores data for multiple tenants, each tenant potentially representing a different enterprise. The data stored by a multi-tenant system can include data associated with different tenants, for example, user accounts, tasks and projects, documents, communications between users, and media objects. Users of such systems encounter a common problem when searching for information. These systems typically provide search functionality, for example, based on an enterprise search engine. The search engines attempt to effectively identify and rank search results representing information that a user is searching for, so as to present the user with the most relevant information.

However, conventional techniques used by search engines for identifying and ranking search results are either slow because they are very computation intensive or present poor quality results. For example, some search engines do not process all relevant information to rank data and therefore provide poorly ranked search results even though these search engines return the search results to the user fast. Poorly ranked search results make it difficult for a user to find the relevant information since the user is forced to manually review all search results to identify the relevant ones. On the other hand, search engines that consider all relevant information for ranking search results require significant computational resources, especially given the large amount of data stored by multi-tenant systems. Therefore, conventional techniques for ranking search results are either very computationally intensive and therefore slow, or they provide poorly ranked search results, thereby providing a poor user experience.

These search engines support the use of natural language for defining the search. Natural language search optimization can rely on logs of previous search results or queries to determine and suggest common search queries to assist the user in generating the natural search language based query. However, generating suggestions and results based on common searches can be counterproductive where a user performs searches that are atypical for the users that perform most searches in the multi-tenant system, since the 'common' suggested search queries and results will always have low relevance to atypical users.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
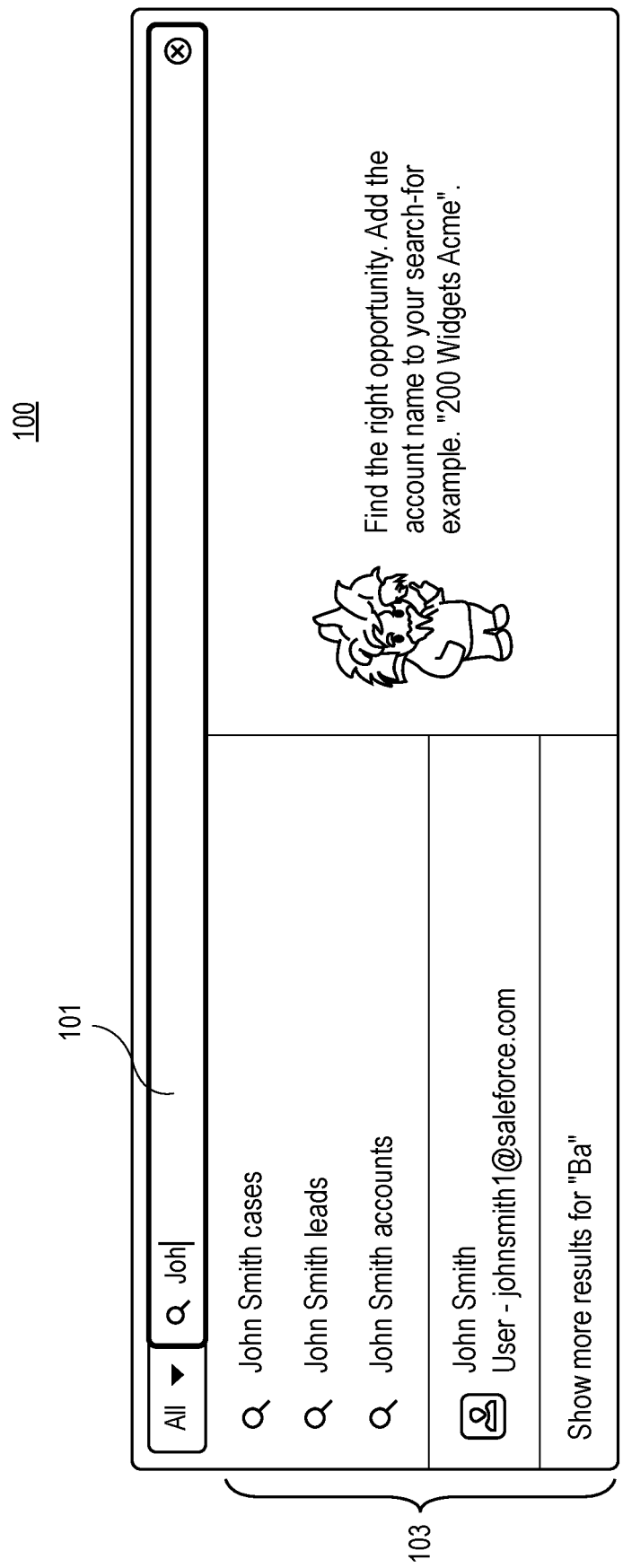
FIG. 1 is a diagram of one example implementation of a user interface for a natural language search that supports personalized natural language search suggestions.

The following description describes methods and apparatus for generating personalized suggestions for natural language search. The example implementations provide a process and system that is scalable, adheres to privacy constraints, and is compatible with a multi-tenant architecture. The implementations utilize a per user co-occurrence model, a training pipeline for updating the co-occurrence model and a modification to the suggestion pipeline to identify and utilize the appropriate co-occurrence model. The co-occurrence model enables identification of per-user and multi-tenant compatible information for ranking suggestions generated by the natural language search processes and system.

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

Overview of Personalized Search Suggestions

Natural Language Search (NLS) queries allow users to dynamically create requests for records using natural language. A 'natural language,' as used herein, is any human language that evolved naturally over time without specific planning. Natural languages are distinct from programming languages, and similar formal languages. Examples of natural languages include English, Spanish, and Chinese. Support for natural language search enables a wide range of users to make use of the search functions without training in a programming language. Thus, with a natural language search support a user can utilize English to search a database for relevant information without needing training in a formal programming language like structured query language (SQL).

In one example, a natural language query can be input into a natural language search engine, as "my open opportunities modified today" This natural language service query input is expected to return to a user all of their 'opportunities' whose state is open, and that were last modified today. In this example, an 'opportunity' is a type of record or object in a database management system that stores information related to a potential deal or sale with a potential customer (i.e., an 'opportunity' for the user or organization of the user to expand the business).

A natural language search engine can support a search across a variety of different data structures, as well as abstractions of data stored in the system. In an example sales system that is presented herein by way of example and not limitation, a sales system can store information across a set of sales objects (e.g., accounts, cases, opportunities, contacts, and leads). A 'set,' as used herein can refer to any positive whole number of items including one item. Thus, data in the sales system is organized as an object of a specific type. The natural language search process is able to search the objects in the sales system to identify and return relevant data.

However, a major challenge in this example sales system setting is how to suggest queries to users that are personalized at scale. The scalability requirement comes from the fact that the example implementations seek to respect privacy (i.e., the implementations cannot use search logs and query histories across tenants of a multi-tenant system) and execute efficiently across the tenants of the multi-tenant system. In addition, the example implementations are adaptable to differing usages of objects and related concepts across tenants. For example, a user of a first organization (i.e., a first tenant) that sells television advertising can have different usage patterns for the objects stored within the system and different usage of concepts of natural language searches than a second organization (i.e., a second tenant) that delivers parcels. The first organization may use the concept of TIME concept very frequently (e.g., sales opportunities for advertisements today) whereas the second organization may use the concept of LOCATION more frequently (e.g., sales opportunities for delivery in a location such as San Francisco) To increase user satisfaction of natural language search functions, the example implementations learn such patterns of concepts and data structure usage at an organizational level and/or at a user level, which can then be used to suggest personalized queries to users of every organization where natural language search is enabled such that the personalized queries are more relevant to the user based on data usage patterns for that user and the organizations associated with that user.

The implementations provide a process and system for providing relevant natural language search suggestions that are more relevant due to being personalized for each user, more specifically where the usage patterns are predicted for each user based on past user history and past organization history.

As used herein, a natural language search query is structured to have two levels, namely, a concept level and a phrase level. A concept is used to group phrases with similar function or meaning in the query. For example, in some example implementations, a set of concepts can be utilized or defined that include 'person,' 'organization,' 'time,' 'standard object,' 'picklist,' 'location (City),' 'location (State),' 'location (Country),' boolean filters, and similar concepts. Concepts can be shared across all tenants (i.e., organizations) in some implementations, or across groupings of similar tenants (i.e., tenants that utilize similar applications, data, and functions in the multi-tenant system) Thus, the implementations handle a natural language search query at a high level as a combination of concepts (in the concept level) and a combination of words (at the phrase level).

FIG. 1 is a diagram of one example implementation of a user interface for a natural language search. The user interface in the example implementation includes a text box 101 in which a user can type any string of text that the natural language search functions begin to process with each character that is input, in response to a pause in typing, or under similar circumstances. For example, the input in text box 101 can be processed in response to detecting a pause of a defined duration (e.g., 400 ms) in typing input. The full search is triggered by a return or selection of a user interface option. As characters in the string are input, the natural language search functions generate a set of suggestions 103 for completion of the natural language search. The suggestions that are displayed can be shown in any location in the user interface 100. In this example, the suggestions 103 are displayed below the text box 101 and update continuously as the text input 101 is provided by a user.

One of the ways users can discover the capabilities of the natural language search engine is via the displayed query suggestions. In the illustrated example, the suggestions 103 include "John Smith cases." "John Smith Leads," and "John Smith accounts." All three of these suggestions share the same concept representation: "PERSON SOBJECT," where Person is "John Smith" and Standard Object (SOBJECT) includes cases, leads and accounts, respectively. This listing of suggestions is according to an implementation of the process to sequence concepts that are personalized from query logs and can be applied in a multi-tenant setting while preserving privacy. In the example, "John Smith" is the current user and the standard objects are tenant-defined, defined by an administrator of a tenant, or similarly identified set of standard objects.

The example implementations model each query input as a two level (hierarchical) representation. A given input query is a sequence of concepts and each concept is a sequence of potentially several words. For example, given this input representation, the implementations can "learn" probabilities from query logs per organization and per user while modeling the sequences as n-grams. An n-gram is a sequence of objects (in this case concepts) When n=2 the sequence is referred to as a bigram, when n=3 tri-grams, and so forth. The learning aspect of the example implementations, given an input sequence of n, consists in learning the probabilities that a user will type a particular sequence of concepts. For example, for a user 'A,' the query logs of that user can be examined to find patterns based on concepts Time and Location, that are specific to the user. For example, the query log for user A can include three queries: PER ACCOUNT TIME, PER ACCOUNT LOCATION, PER ACCOUNT LOCATION. In this example case, the process can calculate that for n=2 a Probability(ACCOUNT having typed PER)=1 (i.e., 100%); Probability(LOCATION having typed ACCOUNT)=⅔ (i.e., 66%); and Probability(TIME having typed ACCOUNT)=⅓ (i.e., 33%) In some implementations, examining query logs or similar history with higher n values allows the process to learn lengthier dependencies between concepts. Using these probabilities as a dictionary, when a user is typing in the text box of a user interface, the process can use the learned possibilities to suggest personalized queries. As a result, a user who is frequently using the LOCATION concept after the ACCOUNT concept, will be provided a lot of similar suggestions due to the process observing high probabilities for the co-occurrence of these concepts.

Figure 2:
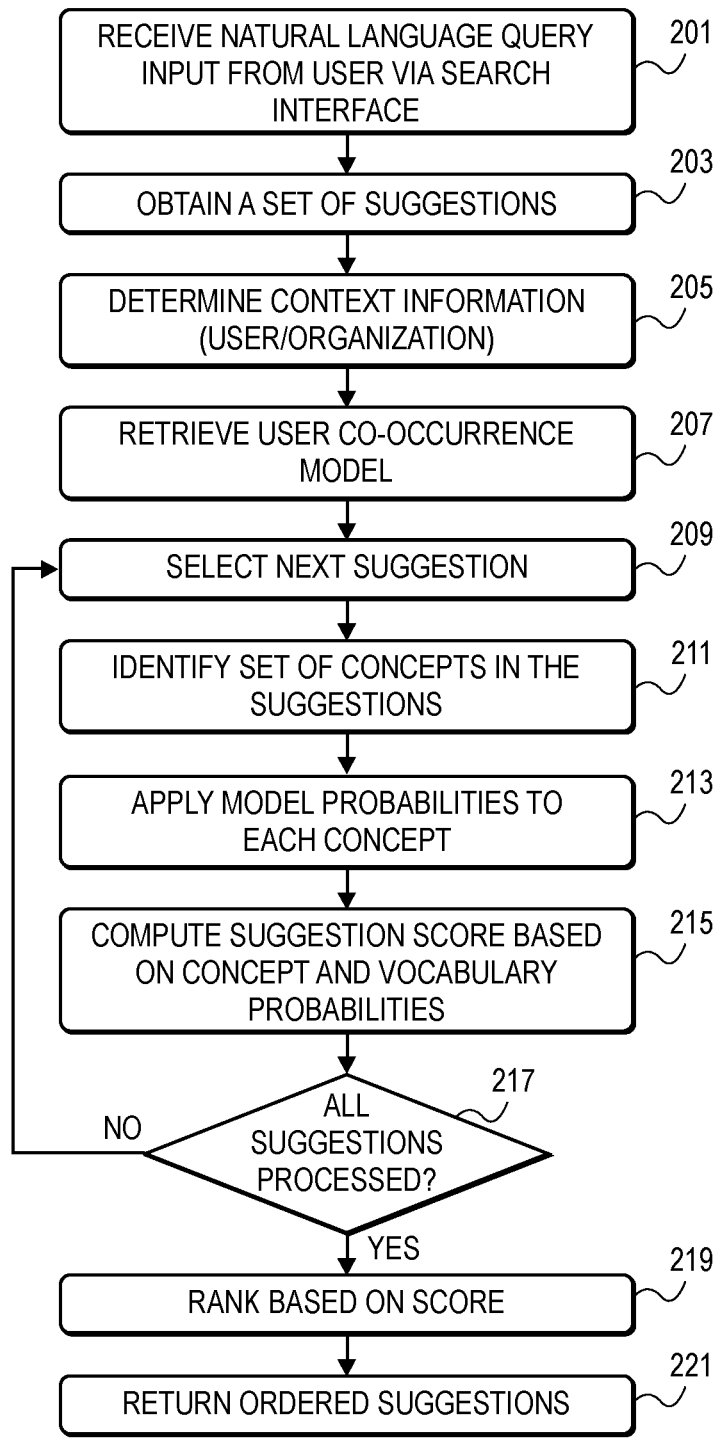
FIG. 2 is a flowchart of one example implementation of a process for providing personalized suggestions for natural language search.

FIG. 2 is a flowchart of one implementation of the process for personalized suggestion ranking. In the example implementation, the process of personalized ranking of the suggestions is triggered by receiving a partial natural language search query input from a user via a user search interface (Block 201). Any number or variety of characters in a text string can be input and received to be processed. Additional input characters can similarly trigger this process to be restarted or updated. The process then requests or receives a set of suggestions from a suggestion pipeline or similar suggestion generation process (Block 203). The process determines context information relevant to the search including a user identifier and/or organization associated with the user (Block 205). The user can be identified by any mechanism or process where the search interface is part of a multi-tenant system where the user has authenticated to gain access to the multi-tenant system and is thereby associated with a user profile. Similarly, a user query log or similar information is maintained and associated with the user profile A user query log can store all previous user queries for analysis. In some implementations, a user query log is maintained per user, while in other implementations, the user query log is a grouping of all users in an organization. Separate logs can be maintained per organization/tenant to ensure privacy and security separation between tenants. In some implementations, the logs for users are separated as well to ensure privacy between users.

Once the user context is determined, then a per user or per organization co-occurrence model can then be retrieved or identified for application to the search input (Block 207). Any number and variety of co-occurrence models can be maintained by the system. These co-occurrence models can be identified or indexed by an associated user, organization, or similar differentiator. With the co-occurrence model retrieved/identified, then the set of suggestions can be analyzed, to identify a set of concepts in the suggestions (Block 211). Concepts can be analyzed or identified using any n-grain depth. The text string can be compared over different segments to identify each of the concepts by comparison with a defined list of concepts recognized by the personalized suggestion system. With each of the concepts identified in the set of suggestions, the co-occurrence model can be applied to identify the probabilities of each of the concepts occurring in any order or sequence (Block 213). As a result, the probabilities for each n-gram sequence of concepts in each suggestion is determined and can be utilized to compute a score based on the identified concept co-occurrences and possible additional vocabulary occurrences that follow the partial input (Block 215).

If all of the suggestions have not been processed, then the process continues to iterate and generate scores for each of the suggestions (Block 209) by selecting a next suggestion to analyze. If all of the suggestions have been processed, then they can be ranked based on the computed probability scores (Block 219). The highest ranked suggestions can be returned to the user as suggestions via the user interface (Block 221). Any number of suggestions can be displayed. The order and number of suggestions displayed can be based on the respective rankings of each suggestion. A set number of suggestions can be displayed in some implementations, while in other implementations each of the suggestions meeting a threshold level are displayed.

Figure 3:
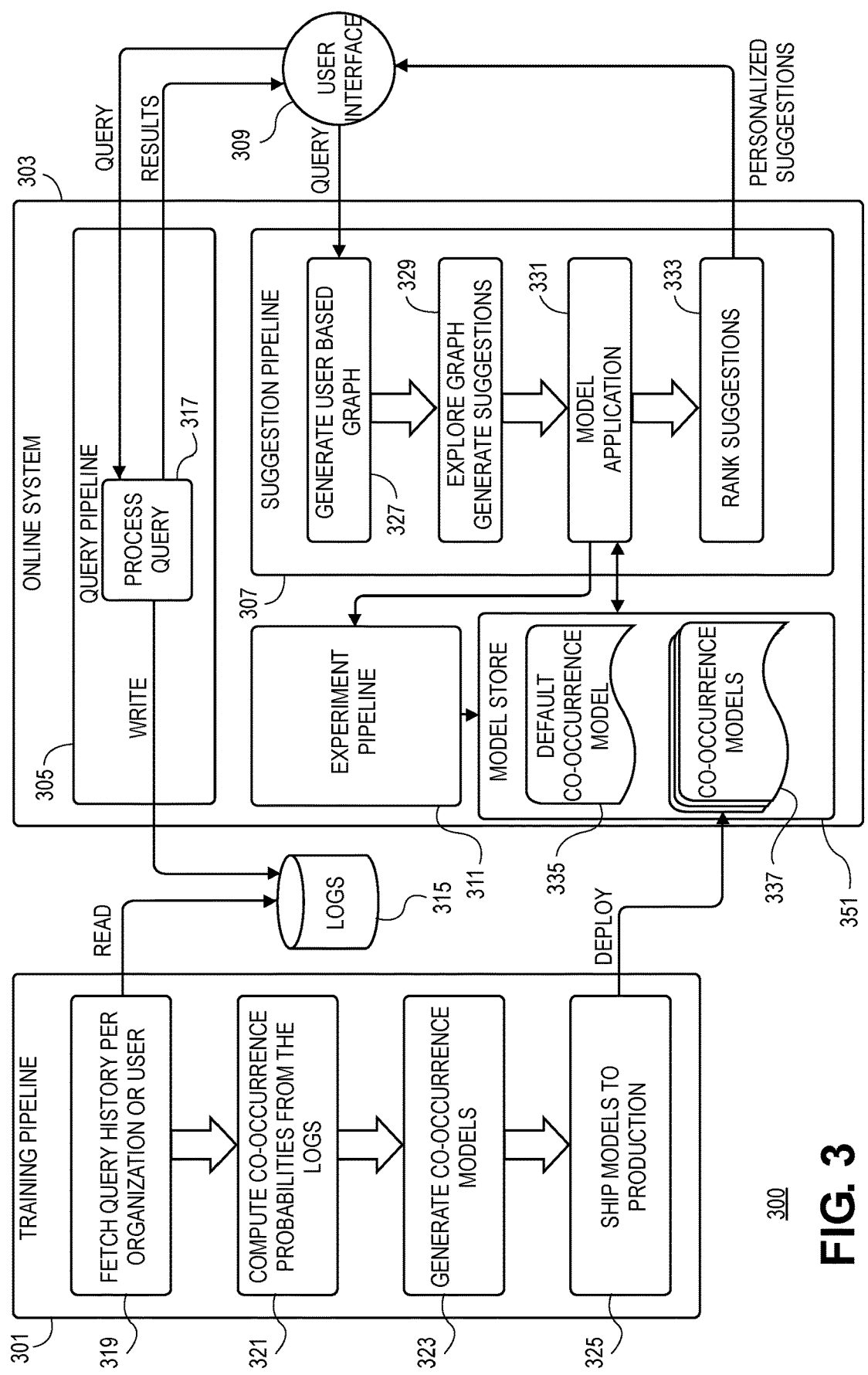
FIG. 3 is a diagram of an example implementation of an operating environment including a search engine with support for personalized natural language search.

FIG. 3 is a diagram of one implementation of a natural language search system 300. The natural language search system 300 includes an online system 303 that receives queries from a user interface 309 and returns results and personalized suggestions to the user interface 309. The online system 303 includes a query pipeline 305 that includes functions 317 to process completed queries either input entirely by the user via the user interface or by selection from suggestions in the user interface 309. The query process functions receive the query, perform the search (using any search processes) and return the results to be displayed in the user interface 309. The query process functions 317 can also record the query in a logs 315 database or similar storage structure. The specific completed query can be recorded along with context information such as the user and/or organization associated with the query.

While a query is being input by a user, a suggestion pipeline 307 can generate and update a set of suggestions to complete the partially input query. For example, if the user has input "where in the" as a partial query then the suggestion pipeline 307 can offer a set of suggestions to complete the partial query such as "where in the building is the meeting," "wherein in the files is the sales data," "where in the world is carmen," or similar suggestions. The suggestions pipeline 307 can generate suggestions by parsing the partial user input as a text string to identify words and to generate a graph of the words, phrases, and/or concepts (Block 327). The suggestions can be generated by traversing the graph using any traversal method (Block 329).

With the set of suggestions generated a selected co-occurrence model can be applied to generate scores for each of the suggestions (Block 331) The co-occurrence model can be selected from a set of available co-occurrence models 337 in a model store 351. The co-occurrence models 337 can be generated on a per user, per organization (i.e., tenant) or similar basis. Similarly, the co-occurrence model 337 that is applied can be selected based on a user generating the search query or an organization of the user. With the score determined for each generated suggestion, the suggestions can be ranked by their scores (e.g., highest to lowest). Any number of the ranked suggestions can be sent to the user interface to be displayed. In some implementations, a fixed number of the highest scored suggestions are sent, whereas in other implementations, the number of suggestions displayed can be dynamic based on a number of quality (i.e., high scoring suggestions), space for suggestion display, and similar criteria. In cases where a matching user/organization co-occurrence model 337 is not found in the model store 351, then a default or generalized co-occurrence model 335 can be selected. The default co-occurrence model 335 can be an abstraction of or derived from a set of user specific or organization specific co-occurrence models, or similarly generated.

In some implementations, an experiment pipeline 311 can also be included in the online system 303. The experiment pipeline 311 can be utilized to test out variations on suggestion pipeline operation 307. For example, the experiment pipeline 311 can test application of co-occurrence models in different context or for different users to identify optimal or improved user experiences. The experiment pipeline 311 can work in tandem with other components and the suggestion pipeline to support AB experiments, metrics collection for the experiments, and similar functionality.

Asynchronous to the operation of the query pipeline 305 and suggestion pipeline 307, the training pipeline 301 can function to generate co-occurrence models 337 on a per user, organization, or similar basis. An input query can be considered to be a sequence of words, phrases, and/or concepts. The sequence can have n members, used to determine n-gram probabilities. The training pipeline continuously, or intermittently iterates through the queries stored in the logs 315 to update or generate co-occurrence models 337 to be deployed to the model store 351.

The training pipeline can retrieve query history on a per user, organization, or similar basis (Block 319) The training pipeline 301 can determine the set of concepts and/or phrases in each query using grammar functions, named entity recognition system, or similar techniques. With a list of the concepts, words, and/or phrases determined from the logs for a given user, organization, or similar entity, the process can compute co-occurrence probabilities for each possible sequence of words of any n-gram length (Block 321) This can be done by selecting only the most probable concept sequences to be recorded or added into the co-occurrence models.

After selection of the highest probability co-occurrences, the models can be formed (Block 323). The models can be data structures, machine learning models, or similar organization of probabilistic relationships that can be applied to input partial search queries to suggest high probability completions or sequences of possible additional terms for the partial query. These models, once complete, can then be deployed to the model store (Block 325).

Exemplary Electronic Devices
Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 4A:
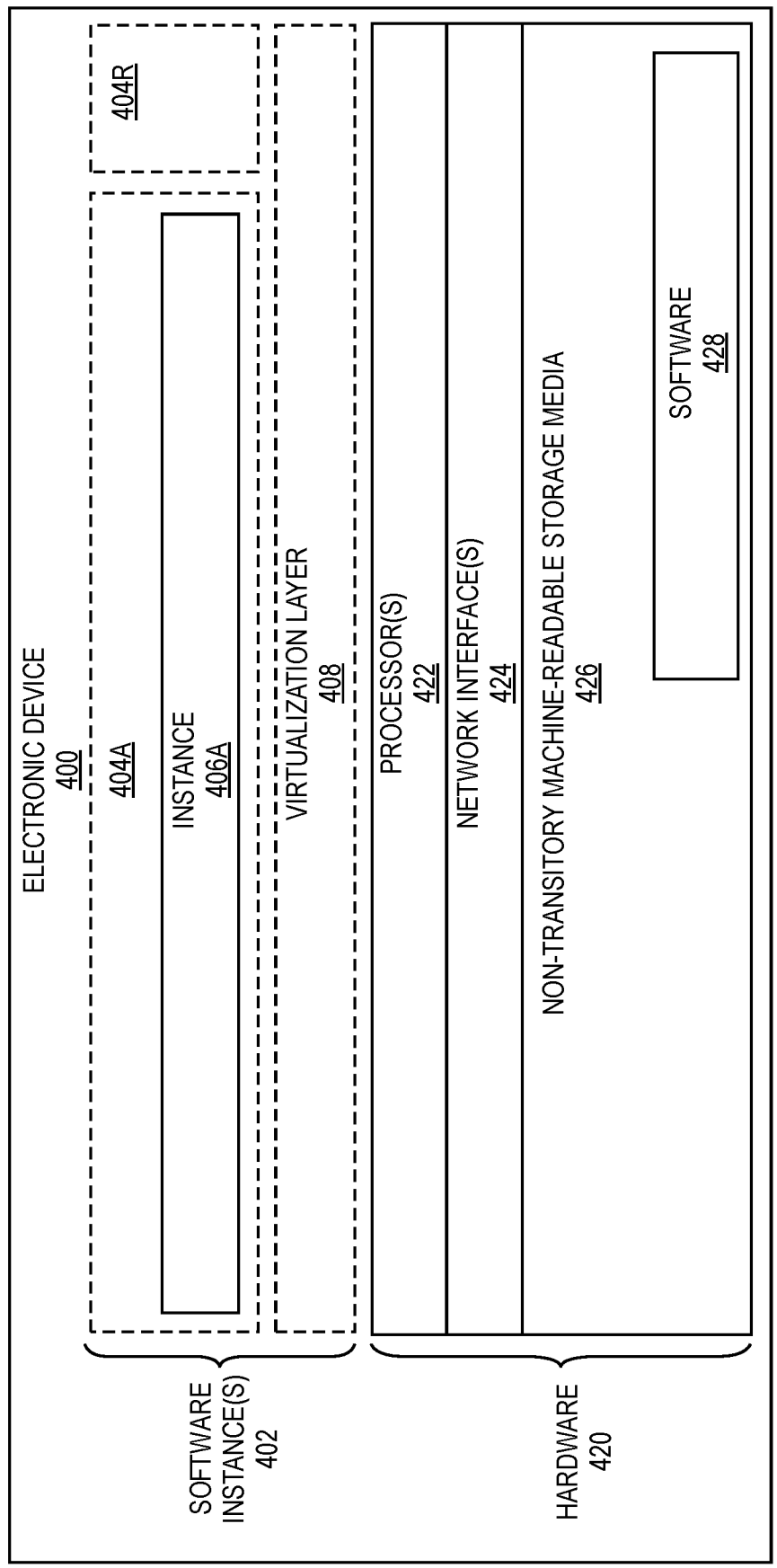
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). The previously described online system including the personalized suggestion functions may be implemented in one or more electronic devices 400. In one implementation: 1) each of the end user clients is implemented in a separate one of the electronic devices 400 (e.g., in user electronic devices operated by users where the software 428 represents the software to implement the end user clients to interface with the natural language search service with personalized suggestions support (e.g., a web browser, a native client, a portal, a command-line interface, and/or an application program interface (API) based upon protocols such as Simple Object Access Protocol (SOAP), Representational State Transfer (REST), etc.)); 2) the natural language search service with personalized suggestions support is implemented in a separate set of one or more of the electronic devices 400 (e.g., a set of one or more server electronic devices where the software 428 represents the software to implement the natural language search service with personalized suggestions support); and 3) in operation, the electronic devices implementing the end user clients and the natural language search service with personalized suggestions support would be communicatively coupled (e.g., by a network) and would establish between them (or through one or more other layers) connections for submitting queries to the natural language search service with personalized suggestions support and returning search results and personalized suggestions to the end user clients. Other configurations of electronic devices may be used in other implementations (e.g., an implementation in which the end user client and the natural language search service with personalized suggestions support are implemented on a single electronic device 400).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

Network Device

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Exemplary Environment

Figure 4B:
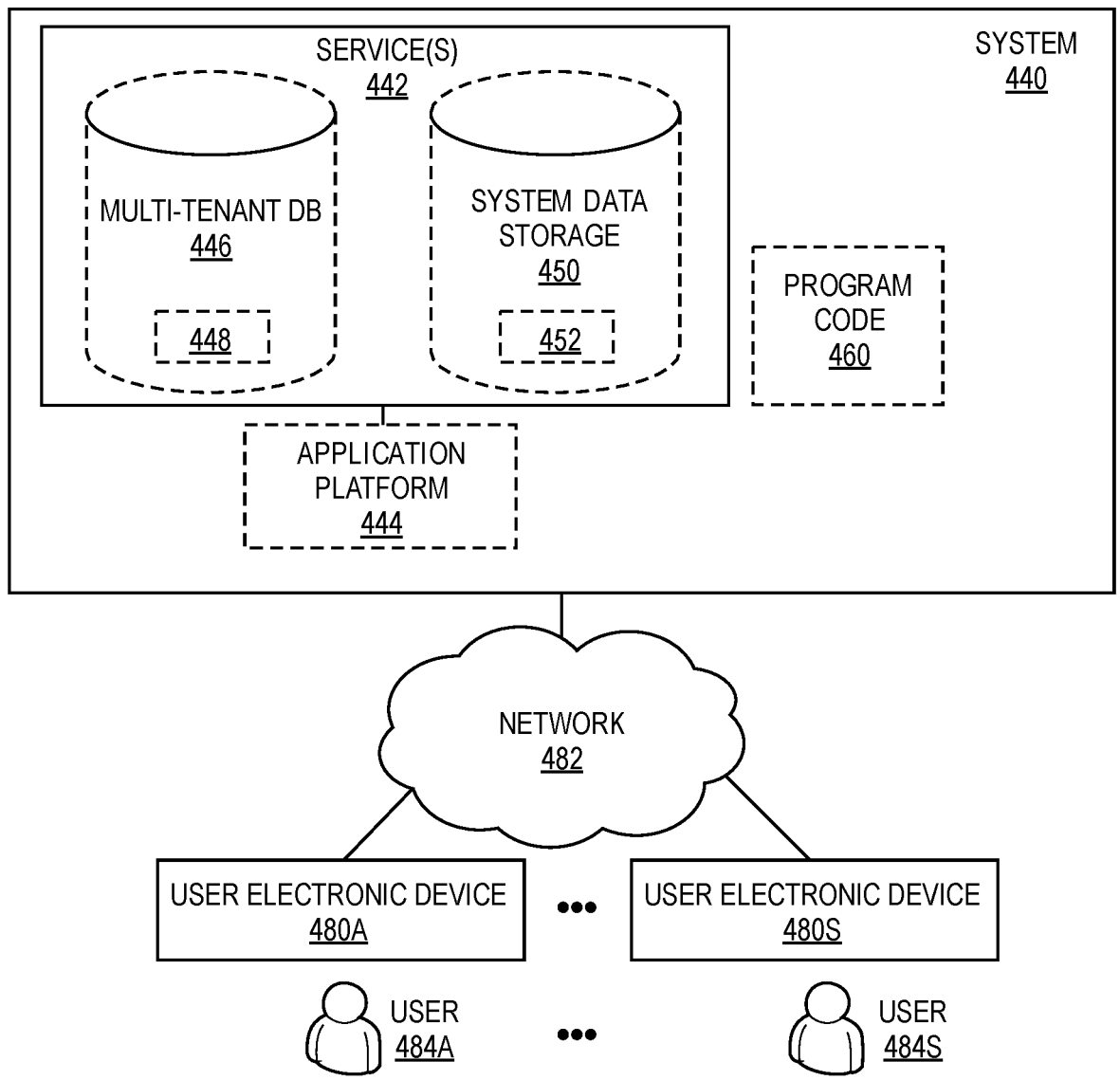
FIG. 4B is a block diagram of an environment where personalized natural language each may be deployed, according to some implementations.

FIG. 4B is a block diagram of an environment where a natural language search service with personalized suggestions support may be deployed, according to some implementations. A system 440 includes hardware (a set of one or more electronic devices) and software to provide service(s) 442, including the natural language search service with personalized suggestions support. The system 440 is coupled to user electronic devices 480A-S over a network 482. The service(s) 442 may be on-demand services that are made available to one or more of the users 484A-S working for one or more other organizations (sometimes referred to as outside users) so that those organizations do not need to necessarily be concerned with building and/or maintaining a system, but instead makes use of the service(s) 442 when needed (e.g., on the demand of the users 484A-S). The service(s) 442 may communication with each other and/or with one or more of the user electronic devices 480A-S via one or more Application Programming Interface(s) (APIs) (e.g., a Representational State Transfer (REST) API). The user electronic devices 480A-S are operated by users 484A-S.

In one implementation, the system 440 is a multi-tenant cloud computing architecture supporting multiple services, such as a natural language search service with personalized suggestions support, a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 440 may include an application platform 444 that enables PAAS for creating, managing, and executing one or more applications developed by the provider of the application platform 444, users accessing the system 440 via one or more of user electronic devices 480A-S, or third-party application developers accessing the system 440 via one or more of user electronic devices 480A-S.

In some implementations, one or more of the service(s) 442 may utilize one or more multi-tenant databases 446 for tenant data 448, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user electronic device 480A-S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the one or more multi-tenant database 446 and/or system data storage 450.

In some implementations, the service(s) 442 are implemented using virtual applications dynamically created at run time responsive to queries from the user electronic devices 480A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the natural language search service with personalized suggestions support, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 440 and the user electronic devices 480A-S.

Each user electronic device 480A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 440. For example, the user interface device can be used to access data and applications hosted by system 440, and to perform searches on stored data, and otherwise allow a user 484 to interact with various GUI pages that may be presented to a user 484. User electronic devices 480A-S might communicate with system 440 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 480A-S might include an HTTP client, commonly referred to as a "browser," for sending and receiving HTTP messages to and from server(s) of system 440, thus allowing users 484 of the user electronic device 480A-S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method of generating personalized suggestions for natural language search queries, the method comprising:

receiving an input of a natural language query from a user;
obtaining a plurality of suggestions are added to the input to form a respective longer natural language query;
identifying, for each of the plurality of suggestions, a respective sequence of concepts with a two-level hierarchical relationship between each concept and a sequence of potentially several words in the respective longer natural language query;
applying a co-occurrence model associated with the user that was generated based on a query history to the sequences of concepts to obtain user specific concept probabilities and vocabulary probabilities;
computing suggestion scores for the plurality of suggestions based on the user specific concept probabilities and vocabulary probabilities; and
ranking the plurality of suggestions based on the suggestion scores.

2. The method of claim 1, wherein a concept is categorization of phrases having a similar function.

3. The method of claim 1, further comprising:
determining context information for the input of the natural language query including at least one of the user or organization to which the user belongs.

4. The method of claim 3, further comprising:
retrieving, as the co-occurrence model associated with the user, a user-specific co-coherence model if one is found or an organization-specific co-coherence model.

5. The method of claim 1, further comprising:
returning the plurality of suggestions to a user interface to be displayed according to the ranking.

6. The method of claim 1, wherein the query history is for the user or an organization associated with the user, further comprising:
retrieving the query history; and
computing co-occurrence probabilities for concepts and vocabulary from the query history.

7. The method of claim 6, further comprising:
generating the co-occurrence model from the co-occurrence probabilities; and
deploying the co-occurrence model for use by a suggestion pipeline.

8. A non-transitory machine-readable storage medium that provides instructions that, if executed by a processor, will cause said processor to perform operations comprising:
receiving an input of a natural language query from a user;
obtaining a plurality of suggestions that are added to the input to form a respective longer natural language query;
identifying, for each of the plurality of suggestions, a respective sequence of concepts with a two-level hierarchical relationship between each concept and a sequence of potentially several words in the respective longer natural language query;
applying a co-occurrence model associated with the user that was generated based on a query history to the sequences of concepts to obtain user specific concept probabilities and vocabulary probabilities;
computing suggestion scores for the plurality of suggestions based on the user specific concept probabilities and vocabulary probabilities; and
ranking the plurality of suggestions based on the suggestion scores.

9. The non-transitory machine-readable storage medium of claim 8, wherein a concept is categorization of phrases having a similar function.

10. The non-transitory machine-readable storage medium of claim 8, having further instructions that, if executed by the processor, will cause the processor to perform further operations comprising:
determining context information for the input of the natural language query including at least one of the user or organization to which the user belongs.

11. The non-transitory machine-readable storage medium of claim 10, having further instructions that, if executed by the processor, will cause the processor to perform further operations comprising:
retrieving, as the co-occurrence model associated with the user, a user-specific co-coherence model if one is found or an organization-specific co-coherence model.

12. The non-transitory machine-readable storage medium of claim 8, having further instructions that, if executed by the processor, will cause the processor to perform further operations comprising:
returning the plurality of suggestions to a user interface to be displayed according to the ranking.

13. The non-transitory machine-readable storage medium of claim 8, wherein the query history is for the user or an organization associated with the user, having further instructions that, if executed by the processor, will cause the processor to perform further operations comprising:
retrieving the query history; and
computing co-occurrence probabilities for concepts and vocabulary from the query history.

14. The non-transitory machine-readable storage medium of claim 13, having further instructions that, if executed by the processor, will cause the processor to perform further operations comprising:
generating the co-occurrence model from the co-occurrence probabilities; and
deploying the co-occurrence model for use by a suggestion pipeline.

15. A computing device to implement a process of generating personalized suggestions for natural language search queries, the computing device comprising:
a non-transitory machine-readable medium having stored therein a suggestion pipeline; and
a processor coupled to the non-transitory machine-readable medium, the processor to execute the suggestion pipeline, the suggestion pipeline to receive an input of a natural language query from a user, obtain a plurality of suggestions that are added to the input to form a respective longer natural language query, identify, for each of the plurality of suggestions, a respective sequence of concepts with a two-level hierarchical relationship between each concept and a sequence of potentially several words in the respective longer natural language query, apply a co-occurrence model associated with the user that was generated based on a query history to the sequences of concepts to obtain user specific concept probabilities and vocabulary probabilities, compute suggestion scores for the plurality of suggestions based on the user specific concept probabilities and vocabulary probabilities, and rank the plurality of suggestions based on the suggestion scores.

16. The computing device of claim 15, wherein a concept is categorization of phrases having a similar function.

17. The computing device of claim 15, wherein the suggestion pipeline is further to determine context information for the input of the natural language query including at least one of the user or organization to which the user belongs.

18. The computing device of claim 17, wherein the suggestion pipeline is further to retrieve, as the co-occurrence model associated with the user, a user-specific co-coherence model if one is found or an organization-specific co-coherence model.

19. The computing device of claim 15, wherein the suggestion pipeline is further to return the plurality of suggestions to a user interface to be displayed according to the ranking.

20. The computing device of claim 15, wherein the query history is for the user or an organization associated with the user, and wherein the processor is further to execute a training pipeline to retrieve the query history, and compute co-occurrence probabilities for concepts and vocabulary the query history.

21. The computing device of claim 20, wherein the processor is further to execute a training pipeline to generate the co-occurrence model from the co-occurrence probabilities, and deploy the co-occurrence model for use by a suggestion pipeline.

* * * * *